(12) United States Patent
West et al.

(10) Patent No.: US 7,002,566 B1
(45) Date of Patent: *Feb. 21, 2006

(54) FAILSAFE DISPLAY OF FRAME LOCKED GRAPHICS

(75) Inventors: Michael G. West, Portland, OR (US); Jamie J. LeVasseur, Vancouver, WA (US)

(73) Assignee: Pixelworks, Inc., Tualatin, OR (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/728,241

(22) Filed: Dec. 3, 2003

Related U.S. Application Data

(63) Continuation of application No. 09/826,493, filed on Apr. 4, 2001, now Pat. No. 6,683,604.

(60) Provisional application No. 60/194,640, filed on Apr. 4, 2000.

(51) Int. Cl.
*G09G 5/007* (2006.01)

(52) U.S. Cl. ......................... 345/204; 345/589

(58) Field of Classification Search .............. 345/204, 345/699, 392, 423, 424, 393, 589, 600, 602, 345/603, 611; 348/207, 231, 393, 424; 349/392
See application file for complete search history.

(56) References Cited

U.S. PATENT DOCUMENTS

| | | | |
|---|---|---|---|
| 5,473,342 A | 12/1995 | Tse et al. | |
| 5,691,768 A * | 11/1997 | Civanlar et al. | 375/240.01 |
| 5,991,883 A | 11/1999 | Atkinson | |
| 6,359,625 B1 | 3/2002 | Perego | |
| 6,466,264 B1 | 10/2002 | Shioji | |
| 6,683,604 B1 * | 1/2004 | West et al. | 345/204 |

* cited by examiner

*Primary Examiner*—Vijay Shankar
*Assistant Examiner*—Nitin Patel
(74) *Attorney, Agent, or Firm*—Marger Johnson & McCollom

(57) ABSTRACT

A system including a failsafe mechanism adapted to visually display frame locked digital image data and a method therefor. The system receives input image data at an input frame rate and/or input resolution. The packing circuit generates coded image data by compressing the input image data. An unpacking circuit decompresses the coded image and provides output image data to a display device at an output frame rate and/or output resolution.

26 Claims, 5 Drawing Sheets

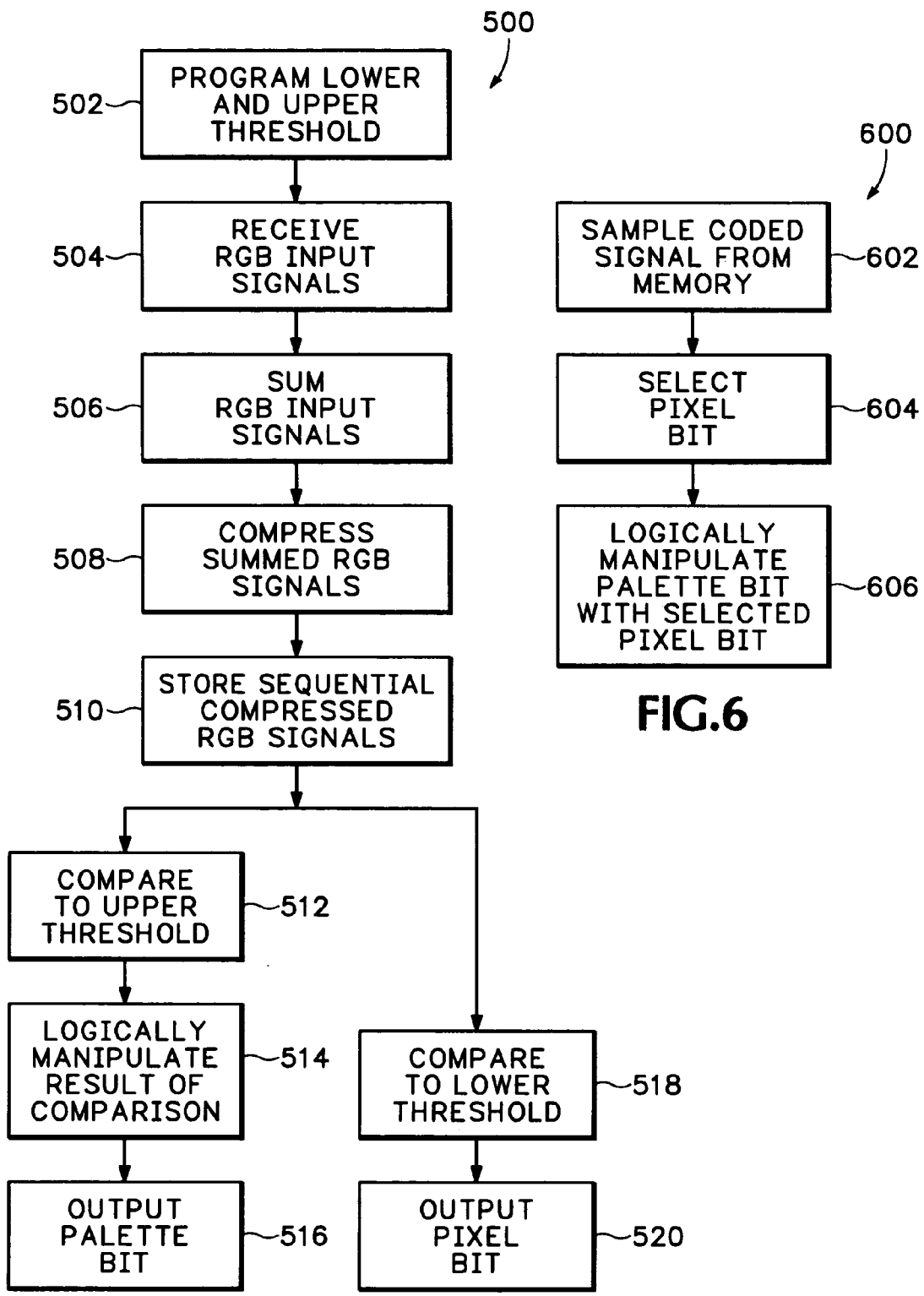

FAILSAFE DISPLAY OF FRAME LOCKED GRAPHICS

This application is a continuation of U.S. patent application Ser. No. 09/826,493, filed Apr. 4, 2001, now U.S. Pat. No. 6,683,604, which claims the benefit of Provisional Application No. 60/194,640, filed Apr. 4, 2000 and is herein incorporated by reference.

BACKGROUND OF THE INVENTION

1. Field of the Invention

This invention relates to a system adapted to visually display digital image data and, more particularly, to a system including a failsafe mechanism adapted to visually display frame locked digital image data and a method therefor.

2. Description of the Prior Art

Digital image data is input to a system adapted to visually display digital image data on a display device. Digital image data is input to a frame locked system one frame at a time at an input frame rate. A frame is an image displayed for viewing on a display device or panel at one time, i.e., one frame of data fits on the display device screen or panel. Each frame includes a rectangular array of pixels. Each pixel has one or more values, for example, a gray scale value for a monochrome display or red, green, and blue (RGB) values for a color display. The resolution of the array, i.e., the number of horizontal and vertical pixels, is often referred to as an image frame resolution. Common display frame resolutions include that shown in Table 1 indicating, in the second and third columns, the number of pixels in the vertical and horizontal dimensions, respectively:

TABLE 1

| VGA | 640 | 480 |
| --- | --- | --- |
| SVGA | 800 | 600 |
| XGA | 1024 | 768 |
| SXGA | 1280 | 1024 |
| UXGA | 1600 | 1200 |
| HDTV | 1280 | 720 |

Digital image data is input at an input frame rate. An input frame rate is the rate at which a frame of data is received by the system. An output frame rate is the rate at which digital image data is provided to a display device for visually displaying the input image data. Common input and output frame rates include 60, 70, and 80 Hz.

Where the output frame rate and/or the resolution match the input frame rate and/or resolution, the frame of image data is be displayed directly without issue. If, however, the input and output frame rates and/or the resolutions differ substantially, the image data might not be properly displayed on the display device. This is particularly true in frame locked systems where small line memories are commonplace since these line memories do not allow for full frame rate conversion of the input frame rate to an output frame rate that matches the frame rate of the display device.

When the input and output frame rates differ, the display device and, more particularly, the software that drives the display device might enter an unrecoverable error mode. For example, assume UXGA image data input at 80 Hz and a VGA display running at 60 Hz. In this circumstance, the system is incapable of displaying the image data. The VGA display device might go blank except perhaps for a single line that reads SYNCH ERROR. A system reset will not generally cure the error because the image data will still be delivered at a frame rate and resolution combination that exceeds the capability of the display device. The software driving the display device will not give a perplexed user a way of changing its settings to ensure the error does not recur.

Accordingly, a need remains for a system including a failsafe mechanism adapted to visually display frame locked digital image data.

BRIEF DESCRIPTION OF THE DRAWINGS

The foregoing and other objects, features, and advantages of the invention will become more readily apparent from the following detailed description of a preferred embodiment that proceeds with reference to the following drawings.

FIG. 5 is a flow diagram of a method of compressing input image data.

FIG. 6 is a flow diagram of a method of decompressing coded image data.

DETAILED DESCRIPTION OF THE PREFERRED EMBODIMENT

Figure 1:
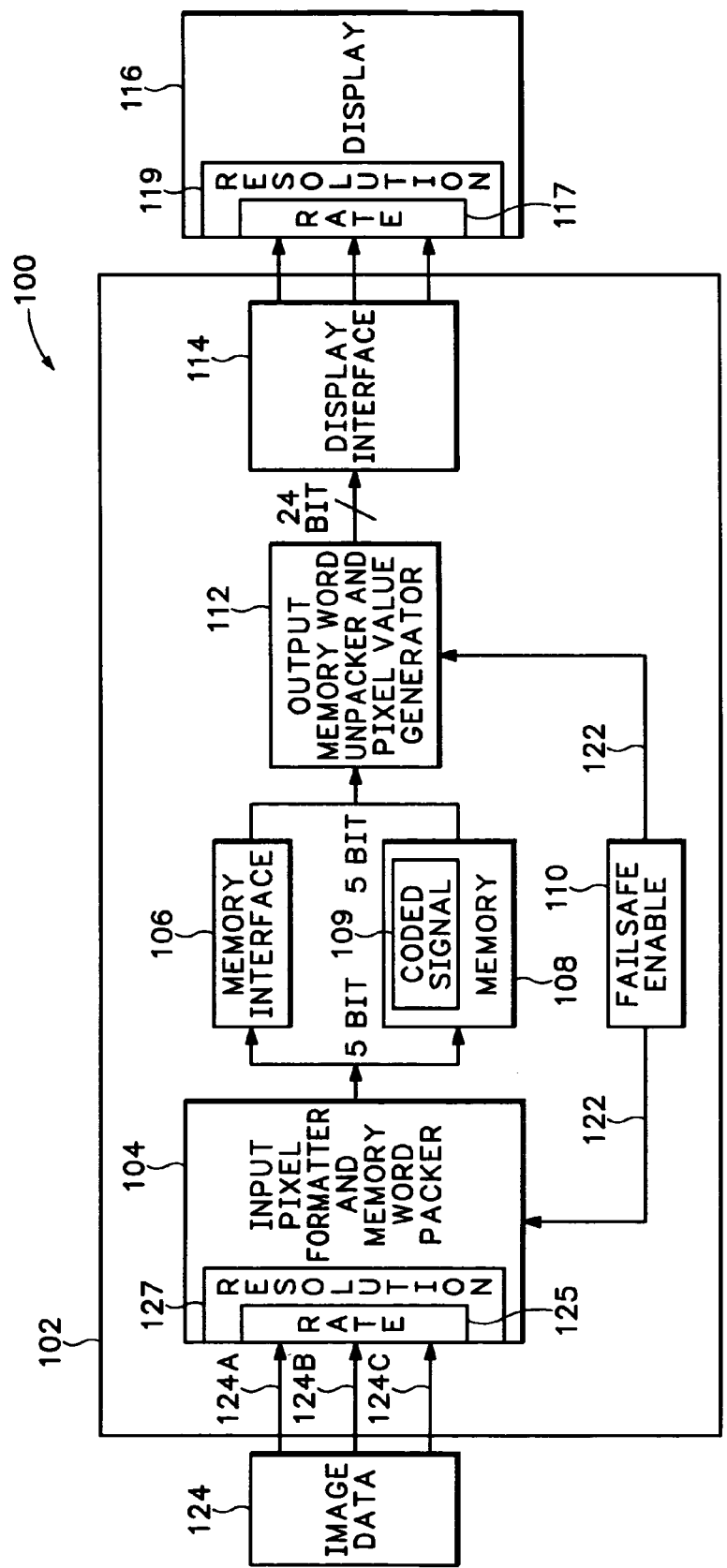
FIG. 1 is a block diagram of an embodiment of the system of the present invention.

Referring to FIG. 1, a frame locked system 100 is adapted to visually display digital image data 124 on a display 116. The image data 124 might, for example, be encoded in RGB signals 124A, 124B, and 124C, respectively, but the invention is not limited in this regard. A person skilled in the art should appreciate that digital images are encoded in a variety of formats. All manner of encoding a digital image is contemplated as coming within the scope of the invention including RGB using 8, 6, or 4 bits, luminance, red chroma, blue chroma (YCRB), and the like.

The system 100 includes a failsafe circuit 102. The failsafe circuit 102 receives the image data signals 124A, 124B, and 124C at an input frame rate 125 and an input resolution 127. Examples of input frame rates 125 are 60 Hz, 70 Hz, 80 Hz, and the like. Examples of input resolutions 127 are VGA, SVGA, XGA, SXGA, and the like.

The display 116 is any device capable of displaying output image data 115 received at an output frame rate 117 and an output resolution 119. Examples of output frame rates 117 are the same as mentioned earlier for input frame rates 125. Examples of output resolutions 119 are the same as mentioned earlier for input resolutions 127. The display 116 might be, for example, a pixelated display that has a fixed pixel structure. Examples of pixelated displays are a liquid crystal display (LCD) projector, flat panel monitor, plasma display (PDP), field emissive display (FED), electro-luminescent (EL) display, micro-mirror technology display, and the like. The output image data 115 might, for example, be encoded in RGB signals 115A, 115B, and 115C but the invention is not limited in this regard. All manner of encoding a digital image is contemplated as coming within the scope of the invention.

The failsafe circuit 102 manipulates the image data signals 124A, 124B, and 124C to thereby generate output image data 115 capable of being displayed at the output frame rate 117 on the display 116. The failsafe circuit includes a pixel packing and formatting circuit 104 coupled to a memory interface circuit 106 and a memory 108. A pixel unpacking and pixel value generator circuit 112 is likewise coupled to the memory interface 106 and the memory 108.

The memory interface 106 controls the memory 108 through an input and output memory bus 118 and 120, respectively. The memory interface 106 is coupled to a microprocessor circuit (not shown) through a microprocessor interface bus (not shown). A person skilled in the art should recognize various circuits and methods of implementing the memory interface 106 within a system as shown in FIG. 1. The memory interface 106 will not be explained in further detail. The memory 108 can be a variety of different types of semiconductor memory including static random access memory (SRAM), pseudo SRAM, dynamic random access memory (DRAM), first-in first-out memory (FIFO), and the like.

The pixel packing circuit 104 receives the input image data 124 at a frame rate 125 and a resolution 127 and generates a coded image data 109 responsive to a failsafe enable signal 122. The coded image data 109 is a compressed representation of the input image data 124, more particularly, of image signals 124A, 124B, and 124C. The coded image data 109 includes a plurality of pixel bits and a palette bit explained in more detail below with reference to FIG. 2. The coded image 109 is subsequently stored in memory 108. The pixel packing circuit 104 optionally positions (or packs) the coded image data 109 into memory words to reduce the amount of memory used when the coded image data 109 is stored in the memory 108. The pixel unpacking circuit 112 retrieves the coded image data 109 from the memory 108. The pixel unpacking circuit 112 then converts the coded image data 109 to output image data 115 having a frame rate 117 and a resolution 119 capable of being displayed on display 116.

The failsafe enable circuit 110 generates the failsafe enable signal 122. The failsafe enable signal 122 is enabled when the combination of input frame rate 125 and/or input resolution 127 exceeds the capabilities of the display 116 with the output frame rate and/or the output resolution 119. The failsafe enable circuit 110 might be a combination of hardware (not shown) and software (not shown) that detects the input frame rate 125 and input resolution 127 from the image data 124 and the output frame rate 117 and output resolution 119 from the display 116. For example, hardware (not shown) comprising registers, counters, and strobes, might sample the input image to count lines, pixels per line, blanking time (time between pixel data and the next line or next frame), and the like. The failsafe enable circuit 110 might comprise further software (not shown) that can decide if the input rate is acceptable for the application, that is, if the display can handle it of if the image can be resized up or down to enable display. The failsafe enable circuit 110 might further comprise software (not shown) that can determine, responsive to a display device's identification number, its frame rate capability. If the image cannot be properly displayed as received, the failsafe enable circuit 110 sets the failsafe enable signal 122.

An embodiment of the invention shown in FIG. 1 is integrated into a monolithic integrated circuit. Alternatively, the invention can be implemented in any number of discrete logic and memory components.

Figure 2:
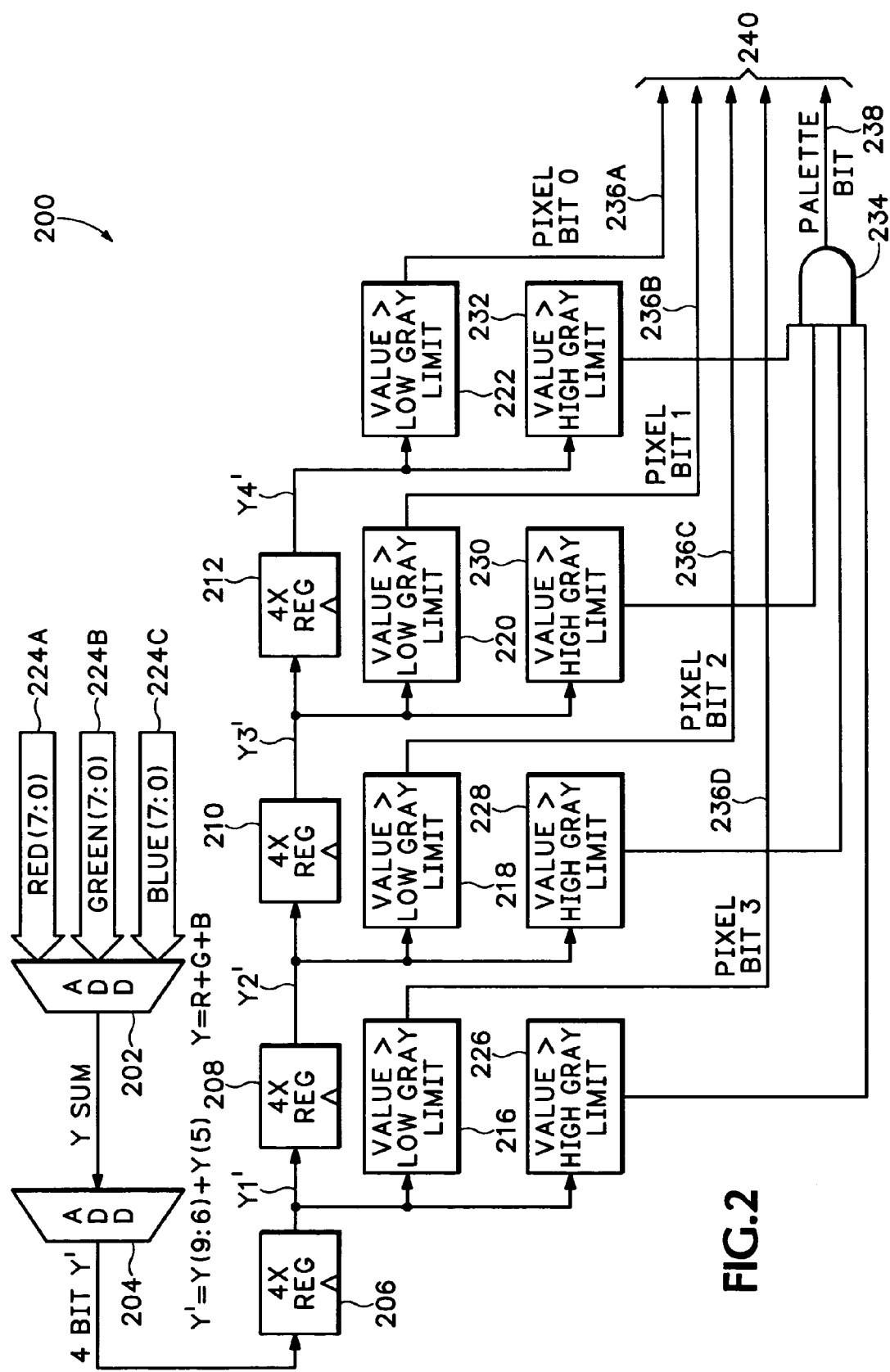
FIG. 2 is a block diagram of an embodiment of a pixel packing circuit.

FIG. 2 shows an exemplary implementation of the pixel packing circuit 104. Circuit 200 generates coded image data 240 by logically manipulating the RGB signals 224A, 224B, and 224C. The coded image data 240 includes a plurality of pixel bits 236A, 236B, 236C, and 236D and a palette bit 238.

Each pixel bit 236A, 236B, 236C, and 236D might have one of three levels—black, gray, and white—depending on the palette bit 238.

The palette bit 238 is a palette selector that selects between gray or white for each plurality of pixel bits. For example, if a pixel bit is at a high logic level, the palette bit determines whether the pixel bit should be represented as gray or white—if the palette bit is high, a logic high pixel bit is represented as white; if the palette bit is low, a logic high pixel bit is represented as gray. If the pixel bit is at a logic low level, the pixel bit is black regardless of the palette bit. A person skilled in the art should recognize that the format and order of the palette and pixel bits could be applied differently and still come within the scope of the present invention.

An example organization of the coded image data 240 is as follows. Bit 0 is the left most bit and bit 3 is the right most bit.

| Palette Bit | Pixel 0 Bit | Pixel 1 Bit | Pixel 2 Bit | Pixel 3 Bit |
| --- | --- | --- | --- | --- |

Circuit 200 includes a first adder 202 connected to a second adder 204. A plurality of serially connected registers 206, 208, 210, and 212 are connected to the second adder 204. A first plurality of comparators 216, 218, 220, and 222 are connected to corresponding registers 206, 208, 210, and 212, respectively. A second plurality of comparators 226, 228, 230, and 232 are likewise connected to corresponding registers 206, 208, 210, and 212, respectively. A logic gate 234 is connected to the second plurality of comparators 226, 228, 230, and 232.

The circuit 200 operates as follows. For exemplary purposes only, let each RGB signals 224A, 224B, and 224C be eight-bits long. The input pixel depth can be extended or reduced from the eight-bit per pixel color described in this example. Each grouping of eight-bit long RGB signals 224A, 224B, and 224C, respectively, represents a single image pixel. The first adder 202 generates a pixel bit intensity (or first adder) signal Y by summing the RGB input signals 224A, 224B, and 224C according to Equation 1. If the RGB signals 224A, 224B, and 224C are eight bits long, the pixel bit intensity signal Y has a maximum of ten bits.

$$Y(9:0)=R(7:0)+G(7:0)+B(7:0) \quad \text{Equation 1}$$

The second adder 204 receives the pixel bit intensity signal Y. The second adder 204 generates a pixel bit upper intensity (or second adder) signal Y' by compressing the pixel bit intensity signal Y according to Equation 2.

$$Y'=Y(9:6)+Y(5) \quad \text{Equation 2}$$

If the image data is input in a color format other than RGB, the pixel bit upper intensity signal Y' need not be used. Other equations might be used to implement the pixel bit intensity signal Y and the upper pixel bit intensity signal Y' depending on the format of the input image data 124 (FIG. 1) and of display 116 (FIG. 1).

The pixel packing circuit 104 generates upper intensity signals Y1', Y2', Y3', and Y4' according to Equation 2 for four sequentially received pixels, each pixel being represented by eight-bit RGB signals 224A, 224B, and 224C. The plurality of registers might comprise registers 206, 208, 210, and 212 but the number and type of registers does not limit the invention. The registers 206, 208, 210, and 212 store the four sequential upper intensity signals Y1', Y2', Y3', and Y4', respectively. In this example, the number of registers equals the number of bits in the pixel upper intensity signal Y' but the invention is not limited in this regard.

The first plurality of comparators might comprise comparators 216, 218, 220, and 222 but the number and type of comparators does not limit the invention. The comparators 216, 218, 220, and 222 generate the plurality of pixel bits 236A, 236B, 236C, and 236D by comparing corresponding upper intensity signals Y1', Y2', Y3', and Y4' to a lower threshold. The second plurality of comparators generate the palette bit 2328 by comparing corresponding upper intensity signals Y1', Y2', Y3', and Y4' to an upper threshold.

The lower and upper thresholds are fully programmable by a user. The lower threshold indicates a low gray limit. All pixel bit values below the lower threshold are represented as black. Likewise, the upper threshold indicates a high gray limit. All pixel bit values above the upper threshold are represented as white.

An example of output color values is provided in Table 1 below.

TABLE 1

| Pixel Bit Upper Intensity Y' | Pixel Bit Value | Color Represented by Pixel Bit |
|---|---|---|
| 0 | 0 | Black |
| 1 | 0 | Black |
| 2 | 0 | Black |
| 3 | 0 | Black |
| Low Gray Threshold set to 4 | | |
| 4 | 1 | Gray |
| 5 | 1 | Gray |
| 6 | 1 | Gray |
| 7 | 1 | Gray |
| High Gray Threshold set to 8 | | |
| 8 | 1 | White |
| 9 | 1 | White |
| 10 | 1 | White |
| 11 | 1 | White |
| 12 | 1 | White |

In Table 1, the upper intensity signal Y' never reaches a value greater than 12 since the maximum value of the upper intensity Y' is twelve. This is shown as follows. If the RGB signals are each at a maximum, that is, at FF hexadecimal, the signals Y and Y' are as follows.

$Y = R + G + B$ $Y = FF_{hexadecimal} + FF_{hexadecimal} + FF_{hexadecimal} = 2FD_{hexadecimal} = 765$ $Y' = B_{hexadecimal} + 1_{hexadeximal} = C_{hexadecimal} = 12$ Thus, the maximum value of the upper intensity signal is 12.

The logic gate 234 generates the palette bit 238 by logically manipulating the outputs of the comparators 226, 228, 230, and 232. Put differently, the palette bit 238 is the result of testing for a logic level e.g., logic low, in any of the pixel bit positions. For example, if the upper intensity signals Y1', Y2', Y3', and Y4' have values greater than or equal to four, the palette bit is set. Under these conditions, the pixel bits will be represented as either gray or white depending on the logic level of the pixel bit.

A person skilled in the art should realize that the pixel packing circuit 104, as explained in the example above, has compressed four pixels represented by corresponding eight-bit RGB signals 224A, 224B, and 224C into the single five-bit coded image signal 240. The coded image signal 240 is stored in memory 108 once every four pixel clocks (not shown). The coded image signal 240 is capable of being stored in a memory 108 that is much smaller than would be required without compression (i.e., four groupings of three eight-bit RGB signals 124A, 124B, and 124C).

Figure 3:
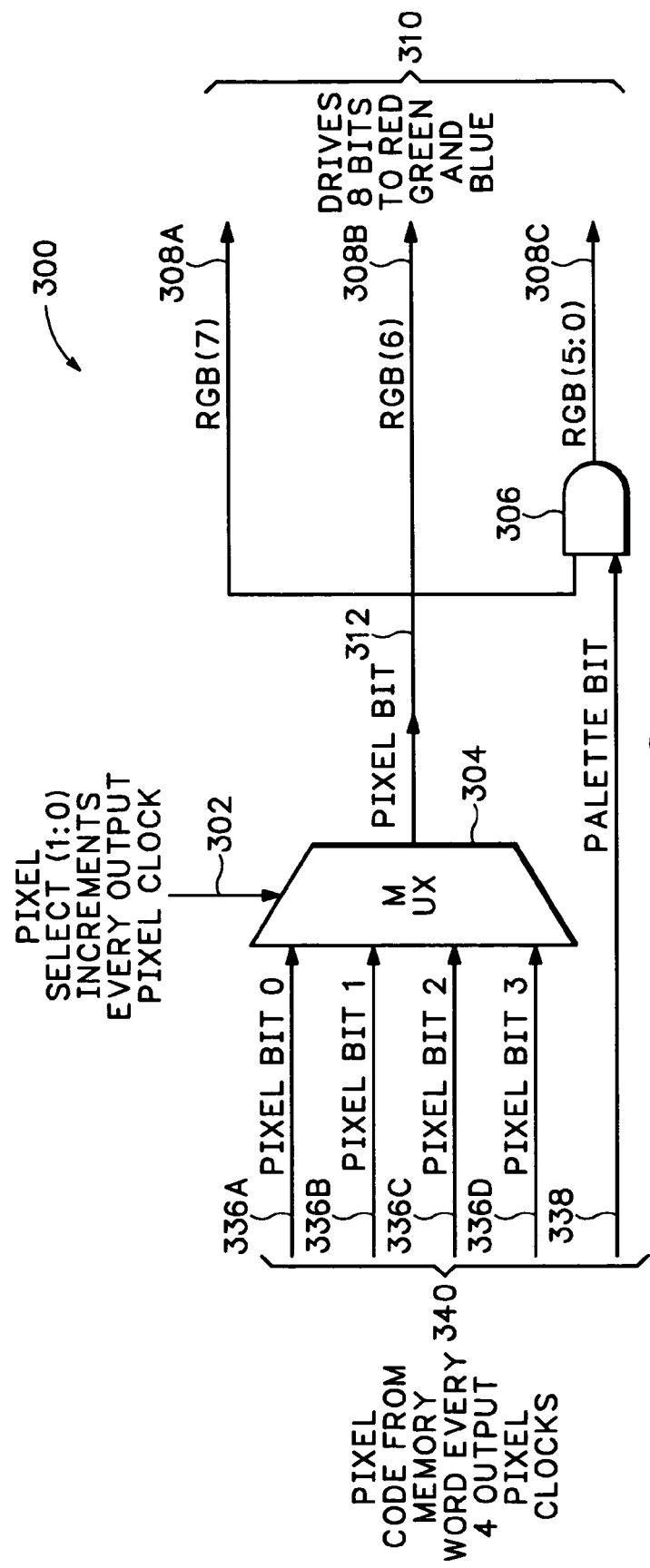
FIG. 3 is a block diagram of an embodiment of a pixel unpacking circuit.

FIG. 3 shows an exemplary implementation of the pixel unpacking circuit 112. Circuit 300 generates the RGB signals 310 provided to the display 116. But, the upper most bit—bit 7 in the example above—of each of the RGB signals generated by circuit 300 is identical. Likewise, the next most upper bit—bit 6—is also identical as are the lower most bits—bits 5 though 0. Circuit 300 samples the coded image data 340 from memory 108 once every four output pixel clocks (not shown).

Circuit 300 comprises a multiplexer 304 adapted to receive the plurality of pixel bits 336A, 336B, 336C, and 336D from the memory 108 (FIG. 1). The multiplexer 304 selects one of the pixel bits 336A, 336B, 336C, and 336D at a time for output to node 312 responsive to a pixel select signal 302. The pixel select signal 302 increments every output pixel clock (not shown). The multiplexer 304 drives the upper most bits 308A and 308B of the RGB signals (bits 7 and 6) provided ultimately to display 116 through display interface 114. Logic gate 306 drives the lower most bits (bits 5 through 0) of the RGB signals by logically manipulating the palette bit 338 and the selected pixel bit at node 312. Thus, the five-bit coded image data 240 (FIG. 2) is converted back to a twenty four-bit RGB signals for each output clock. But the output RGB signals are a grayscale (or compressed RGB) version of the input RGB signals provided to the display 116 (FIG. 1) at the output frame rate 117 and/or the output resolution 119.

It should also be noted that the image quality output using the above described compression scheme might be improved with well known dithering techniques in which adjacent pixel values are evaluated to determine the best intensity to display for a pixel.

A person skilled in the art should recognize that the system provided above receives a color image represented by RGB signals at the input frame rate and/or input resolution, compresses and converts the input RGB signals, and outputs a gray scale representation of the color image at the output frame rate and/or output resolution. By doing so, the user (not shown) avoids an irrecoverable error mode and has the opportunity to change the settings on the display system such that the input frame rate and/or input resolution does not exceed the capabilities of the display, that is, does not exceed the output frame rate and/or output resolution thereby ensuring that the display is capable of displaying the color version of the image input.

It should be readily apparent that one or more devices that include logic circuit might implement the present invention. A dedicated processor system that includes a microcontroller or a microprocessor may alternatively implement the present invention.

The invention additionally provides methods, which are described below. Moreover, the invention provides apparatus that performs or assists in performing the methods of the invention. This apparatus may be specially constructed for the required purposes or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet®.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. A person having ordinary skill in the art should recognize that the boxes described below may be implemented in different combinations, and in different order. Some methods may be used for determining a location of an object, some to determine an identity of an object, and some both.

Figure 4:
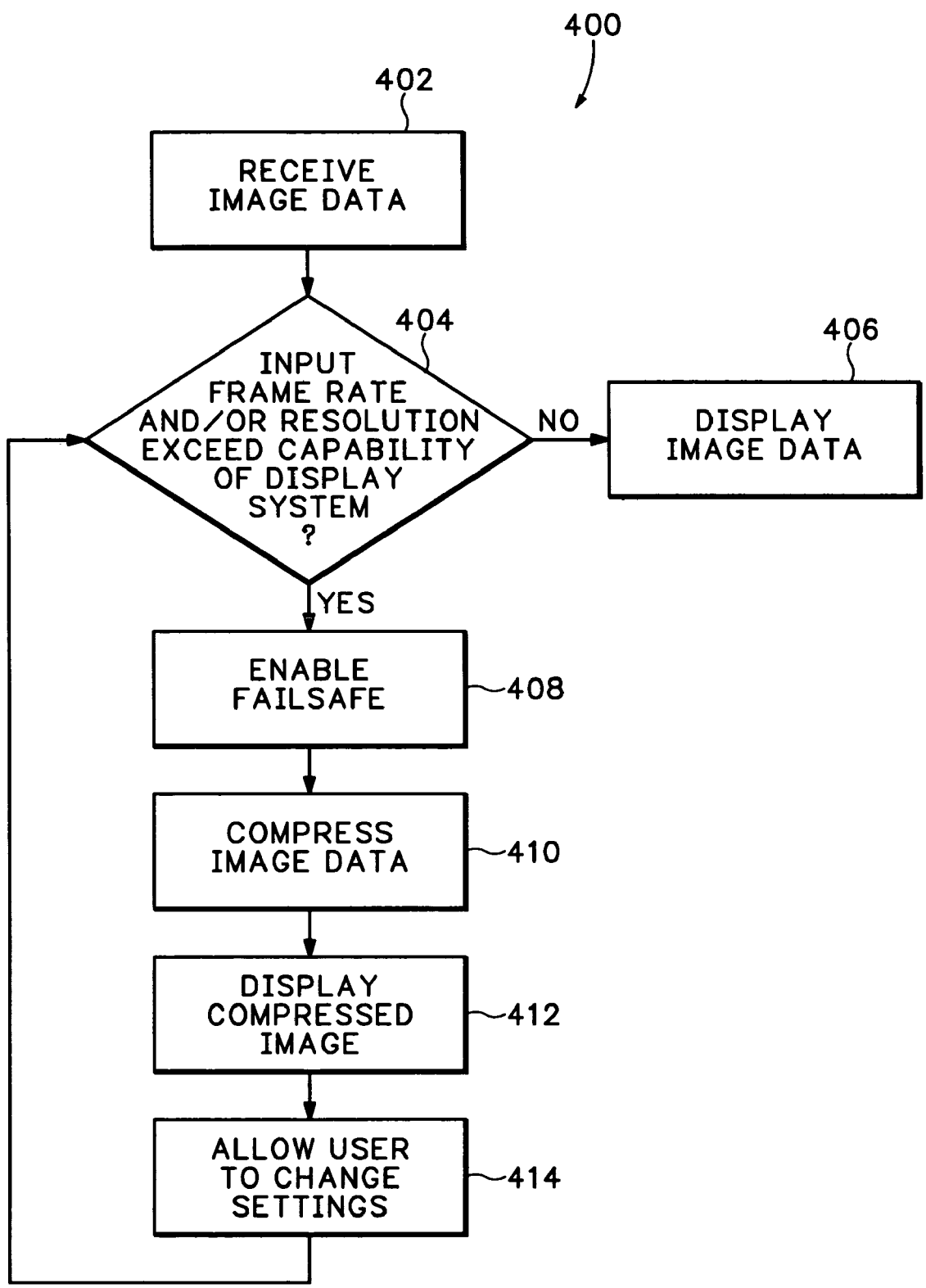
FIG. 4 is a flow diagram of a method of failsafe display of frame locked graphics.

Referring to FIG. 4, input image data is received at the input frame rate and/or the input resolution at box 402. The input frame rate and/or resolution are compared to the output frame rate and/or resolution of the display device (box 404). If the input frame and/or resolution do not exceed the capabilities of the display system, the image data is displayed on the display device without issue.

If the input frame and/or resolution exceed the capabilities of the display system, a failsafe is enabled at box 408 and the input image data is converted and compressed at box 410. The compressed image is displayed on the display device at box 412. Once the compressed image is displayed, a user has the ability to change the system settings such that the input frame rate does not exceed the output frame rate. For example, if color input image data is received at an input frame rate that exceeds the output frame rate of the display, a failsafe is enabled. The failsafe mechanism compresses the input image data such that a grayscale version of the color input image is provided to the display at the output frame rate.

The system of the present invention thus allows a form of frame rate conversion of the input image data that does not necessitate large, expensive memory associated with non-frame locked display systems. The method described in FIG. 4 also allows the user to change the settings on the system such that the input frame rate and/or resolution do not exceed the capabilities of the display system thereby avoiding an unrecoverable system error.

FIG. 5 is a flow diagram of a method of compressing input image data. The input image data is received at box 504. The user has the option of programming a lower and upper threshold at box 502 prior to the receipt of the input image data but the invention is not limited in this regard. At box 506, a pixel intensity signal is generated by summing e.g., the RGB signals, comprising the input image data. A pixel upper intensity signal is generated at box 508 by summing portions of the pixel intensity signal e.g., the uppermost bits to another bit of the pixel intensity signal.

At box 510, sequential pixel upper intensity signals are stored in a plurality of registers. The stored pixel upper intensity signals are compared to an upper threshold at box 512. The results of the comparison are logically manipulated to generate the palette bit at box 514. At box 516, the palette bit is output to a memory. At box 518, the stored pixel upper intensity signals are compared to a lower threshold. The results of the comparison are output to a memory as a plurality of pixel bits at box 520.

FIG. 6 is a flow diagram of a method of decompressing the coded image signal stored in memory from the packing circuit shown in FIG. 1. At box 602, the coded image signal is sampled from memory every n pixel clocks e.g., every four pixel clocks. A pixel bit from the plurality of pixel bits is selected every pixel clock at box 604. The selected pixel bit forms the upper bits of the output image data e.g., the RGB signals provided to the display device. The palette bit is logically manipulated with the selected pixel bit to thereby generate the lower bits of the output image data e.g., the RGB signals provided to the display device.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A display system adapted to display input image data received one frame at a time at an input frame rate and an input resolution on a display having an output frame rate and an output resolution, comprising:
   a pixel packing circuit adapted to generate coded image data responsive to a failsafe enable signal, the coded image data being a compressed representation of the input image data including a plurality of pixel bits and a palette bit, the palette bit to select one of a plurality of levels in a color palette for representing each of the pixel bits; and
   a pixel unpacking circuit adapted to generate output image data capable of being displayed on the display by manipulating the coded image data responsive to the palette bit.

2. The display system of claim 1 further comprising a memory adapted to store the coded image data.

3. The system of claim 1 wherein the pixel packing circuit includes:
   an input terminal adapted to receive the input image data; and
   a logic circuit adapted to generate the coded image data by logically manipulating the input image data.

4. The system of claim 3 wherein the input image data includes a plurality of digital image signals and wherein the logic circuit includes:
   a first adder adapted to generate a first adder signal by adding the plurality of digital image signals;
   a second adder adapted to generate a second adder signal by adding first and second portions of the first adder signal;
   a plurality of registers coupled to the second adder and each adapted to store sequential second adder signals; and
   a first plurality of comparators adapted to generate a plurality of pixel bits by comparing the second adder signal to a first threshold limit;
   a second plurality of comparators adapted to compare the second adder signal to a second threshold limit; and
   a logic gate adapted to generate a palette bit by logically manipulating signals output from the second plurality of comparators.

5. The system of claim 4 wherein the first and second threshold limits are programmable.

6. The system of claim 4 wherein the plurality of digital image signals include RGB image signals.

7. The system of claim 4 wherein the plurality of registers includes as many registers as there are bits in the second adder signal.

8. The system of claim 1 wherein the pixel unpacking circuit includes a multiplexer circuit adapted to generate the output image data responsive to a pixel select signal.

9. The system of claim 8 wherein the coded image data includes a plurality of pixel bits and a palette bit and wherein the multiplexer circuit includes a multiplexer and a logic gate, the multiplexer selecting one of the pixel bits responsive to the pixel select signal and the logic gate generating a logic gate output signal by logically manipulating the selected pixel bit and the palette bit.

10. The system of claim 1 wherein the failsafe enable signal includes a first and second logic states, the first logic state indicating that the input frame rate exceeds the output fame rate.

11. A system for visually displaying digital images, comprising:
    input image signals provided to the system one frame at a time, the input image signals having input characteristics;
    a display capable of displaying output image signals having output characteristics;
    a failsafe enable adapted to identify when the input characteristics exceeds the output characteristics;
    a packing circuit adapted to generate a coded signal by compressing the input image signals responsive to the failsafe enable, the coded signal including a plurality of pixel bits and a palette bit, the palette bit being adapted to select one of a plurality of levels in a color palette for representing each of the pixel bits;
    a memory adapted to store the coded signal; and
    an unpacking circuit adapted to generate the output image signals at the output characteristics by logically manipulating the coded signal responsive to the palette bit.

12. The system of claim 11 wherein the input characteristics include an input frame rate and an input resolution and wherein the output characteristics include an output frame rate and an output resolution.

13. The system of claim 11 wherein the coded signal includes a plurality of pixel bits and a palette bit and wherein the packing circuit includes:
    a first adder adapted to generate a first adder signal by adding the input image signals;
    a second adder adapted to generate a second adder signal by adding first and second portions of the first adder signal;
    a plurality of serially connected registers coupled to the second adder, each register being adapted to store sequential second adder signals; and
    a first plurality of comparators adapted to generate the plurality of pixel bits by comparing the second adder signal to a first threshold;
    a second plurality of comparators adapted to generate a corresponding plurality of comparator signals by comparing the second adder signal to a second threshold; and
    a logic gate adapted to generate the palette bit by logically manipulating the plurality of comparator signals.

14. The system of claim 11 wherein the coded signal includes a plurality of pixel bits and a palette bit and wherein the unpacking circuit includes:
    a multiplexer adapted to select one of the plurality of pixel bits; and
    a logic circuit adapted to logically manipulate the selected pixel bit with the palette bit.

15. The system of claim 11 wherein the input image signals include RGB signals representative of a color image and wherein the output image signals represent a gray scale version of the color image.

16. A failsafe circuit, comprising:
an input pixel formatter circuit adapted to receive input signals at an input frame rate and an input resolution representative of an image and adapted to generate a coded signal representing a compressed version of the image, the coded signal including a plurality of pixel bits and a palette bit to select one of a plurality of levels in a palette;
a memory buffer adapted to store the coded signal; and
a pixel value generator circuit adapted to generate output signals by manipulating the coded signals responsive to the palette bit.

17. The failsafe circuit of claim 16 wherein the input pixel formatter comprises:
a first adder adapted to generate a pixel bit intensity signal by digitally adding the input signals;
a second adder adapted to generate a pixel bit upper intensity signal by adding a first portion of the pixel bit intensity signal to a second portion of the pixel bit intensity signal;
a plurality of registers adapted to store sequential upper bit intensity signals; and
a first plurality of comparators adapted to generate the plurality of pixel bits by comparing corresponding upper bit intensity signals stored in the plurality of registers to a first threshold;
a second plurality of comparators adapted to generate a corresponding plurality of comparator signals by comparing corresponding upper bit intensity signals stored in the plurality of registers to a second threshold; and
a logic circuit adapted to generate the palette bit by logically manipulating the plurality of comparator signals.

18. The failsafe circuit of claim 17 wherein the first and second thresholds are programmable.

19. The failsafe circuit of claim 17 wherein there are as many registers in the plurality of registers as there are pixel bits in the plurality of pixel bits.

20. The failsafe circuit of claim 17 wherein the input signals are RGB color signals and wherein the output signals are a gray scale version of the RGB color signals.

21. The failsafe circuit of claim 17 wherein the coded signal represents a compression of a plurality of RGB signals.

22. The failsafe circuit of claim 17 wherein the pixel value generator circuit comprises:

a multiplexer adapted to select one of the plurality of pixel bits; and
a logic circuit adapted to logically manipulate the selected pixel bit with the palette bit.

23. A method for automatically displaying digital image data having an input frame rate on a display having an output frame rate, comprising:
enabling a failsafe signal if the input frame rate exceeds the output frame rate;
compressing the image data responsive to the failsafe signal, the compressed image data including a palette bit to select one of a plurality of levels in a palette;
displaying the compressed image data; and
allowing a user to change display settings after displaying the compressed image data.

24. The method of claim 23 wherein compressing the image data includes:
receiving RGB input signals at the input frame rate, the RGB signals being representative of a color image;
generating a pixel intensity signal by summing the RGB signals;
generating an upper pixel intensity signal by summing a first and second portion of the pixel intensity signal;
repeating for a predetermined number of times receiving, generating a pixel intensity, and generating an upper pixel intensity;
storing sequential upper pixel intensity signals in a plurality of registers;
generating a plurality of pixel bits by comparing the sequentially stored upper pixel intensity signals to a low threshold;
comparing the sequentially stored upper pixel intensity signal to a high threshold; and
generating the palette bit by logically manipulating results of the comparing to the high threshold.

25. The method of claim 24 further comprising programming the low and high thresholds.

26. The method of claim 24 wherein compressing the image data comprises:
generating a coded signal with the plurality of pixel bits and the palette bit, the coded signal representing a plurality of image pixels;
storing the coded signal in a memory;
sampling the stored coded signal at a sampling rate;
selecting a pixel bit from the coded signal at the output frame rate;
logically manipulating palette bit with the selected pixel bit at the output frame rate.

* * * * *

UNITED STATES PATENT AND TRADEMARK OFFICE
CERTIFICATE OF CORRECTION

PATENT NO. : 7,002,566 B1
APPLICATION NO. : 10/728241
DATED : February 21, 2006
INVENTOR(S) : West et al.

It is certified that error appears in the above-identified patent and that said Letters Patent is hereby corrected as shown below:

At column 4, lines 21-23, please replace

"Palette Bit    Pixel 0 Bit    Pixel 1 Bit    Pixel 2 Bit    Pixel 3 Bit "

with

-- | Pallette Bit | Pixel 0 Bit | Pixel 1 Bit | Pixel 2 Bit | Pixel 3 Bit | --

At column 10, line 14, please replace "fame rate" with --frame rate--

Signed and Sealed this

Ninth Day of January, 2007

JON W. DUDAS
*Director of the United States Patent and Trademark Office*